Jan. 7, 1947.　　　H. L. KITSELMAN ET AL　　　2,414,045
LINE-WIRE REINFORCEMENT
Filed Sept. 11, 1943　　　2 Sheets-Sheet 1
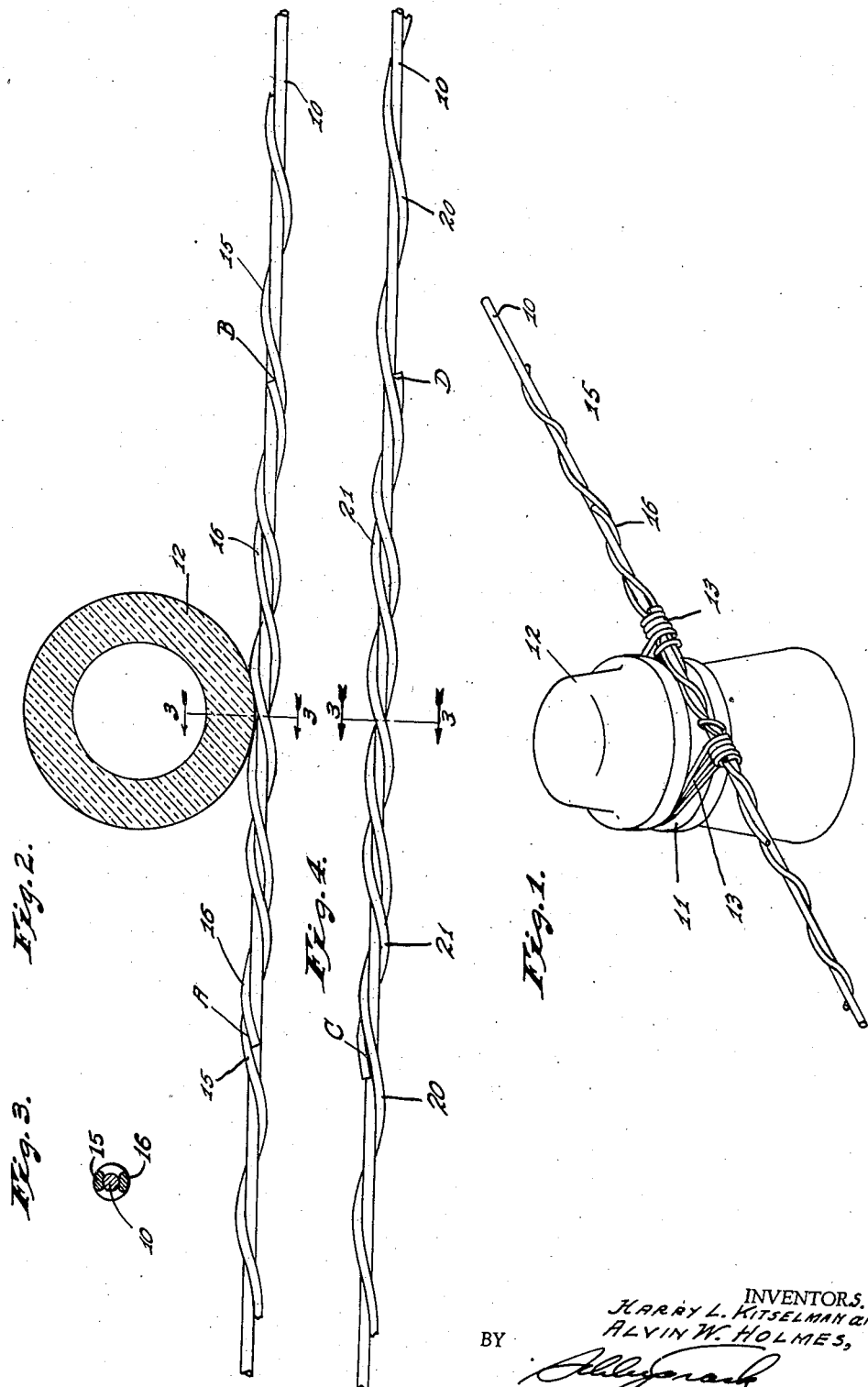
INVENTORS.
HARRY L. KITSELMAN and
ALVIN W. HOLMES,
BY
ATTORNEYS Jan. 7, 1947.　　　H. L. KITSELMAN ET AL　　　2,414,045
LINE-WIRE REINFORCEMENT
Filed Sept. 11, 1943　　　2 Sheets-Sheet 2

INVENTORS.
HARRY L. KITSELMAN and
ALVIN W. HOLMES;
BY
ATTORNEYS.

Patented Jan. 7, 1947

2,414,045

UNITED STATES PATENT OFFICE 2,414,045

LINE-WIRE REINFORCEMENT

Harry L. Kitselman and Alvin W. Holmes, Muncie, Ind., assignors to Indiana Steel & Wire Company, Muncie, Ind., a corporation of Indiana Application September 11, 1943, Serial No. 501,950

14 Claims. (Cl. 174—42)

Our invention relates to line-wire reinforcements of the type used to reinforce and protect a line wire in the vicinity of its point of attachment to a support such as an insulator.

It is the object of our invention to produce a line-wire reinforcement which will embrace the line wire in the vicinity of the support, which will reduce stresses in the line wire incident to the supporting function, and which will prevent contact between the line wire and the support as well as between the line wire and the tie-wire which secures it to the support. A further object of our invention is to produce a reinforcement which can be simply and economically manufactured and readily applied to the line wire in the field.

In carrying out our invention, we make the reinforcement of a plurality of pre-formed open-wound wire helixes adapted to embrace the line wire tightly, and we make each helix of such a pitch that it can be wrapped around the line wire within the limits of its elastic deformation. We arrange these helixes on the line wire so that at least portions of them overlap axially and intertwine, and so that the middle of their overlapping portions will be located immediately adjacent the support. The respective pitches of the several helixes may be the same, and in any case are nearly enough the same that the overlapping portions will contain several turns of each helix, and the several helixes have a relative axial disposition such that, at least near the middle of their overlapping portions, adjacent helix-turns of the different helixes will be spaced apart and approximately equally spaced around the line wire. To provide for locating the helixes in the specified relative axial disposition, they are so formed as to interengage at one or more points spaced axially from the support. Desirably, the helixes are so formed and arranged that they will respectively extend for different distances from the support in each direction along the line wire, as such an arrangement results in the reinforcement's possessing less stiffness at its ends than at its center and hence tends to avoid a localization of stresses in the line wire.

Figure 5:
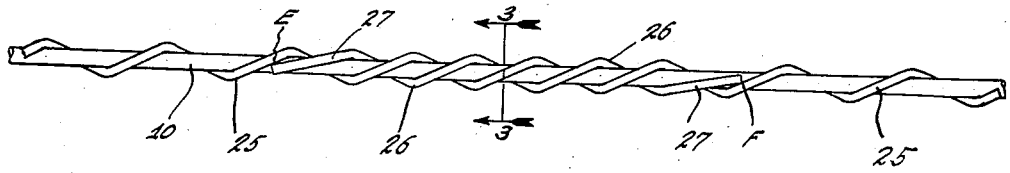
Figure 6:
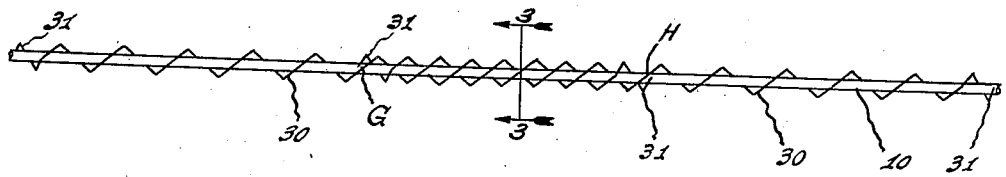
Figure 7:
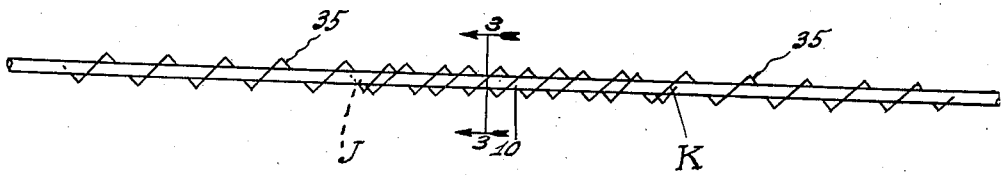
Figure 8:
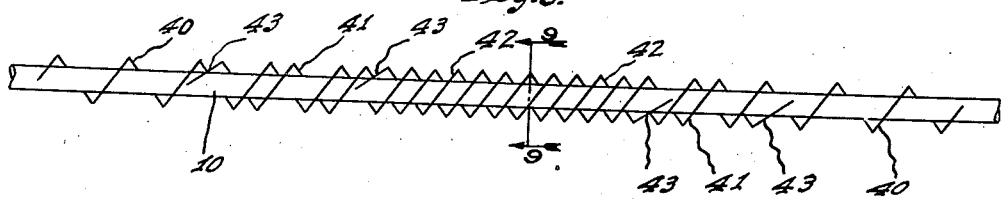
Figure 9:

The accompanying drawings illustrate our invention: Fig. 1 is an isometric view showing a 2-wire reinforced line wire attached to an insulator; Fig. 2 is a horizontal section through the groove of the insulator showing the line wire, its reinforcement, and the tie in place; Fig. 3 is a vertical section on the lines 3—3 of Figs. 2, and 4 to 7 inclusive; Figs. 4 and 5 are plan views showing modified forms of 2-wire reinforcements; Figs. 6 and 7 are diagrammatic plan views illustrating further modifications of a two-wire reinforcement; Fig. 8 is a diagrammatic plan view showing a 3-wire reinforcement; and Fig. 9 is a cross-section on the line 9—9 of Fig. 8.

As shown in Fig. 1, the line wire 10 is supported in the groove 11 of an insulator 12 by a tie-wire 13. At the insulator, and for a distance along the line wire in both directions from the insulator, the line wire is embraced by a reinforcement which, in the construction shown in Figs. 1 to 3, comprises two overlapping wires 15 and 16. Each of the wires 15 and 16 is a pre-formed open-wound helix of such a diameter as to embrace the line wire 10 tightly and of such a pitch as to be capable of being wrapped around the line wire without permanent distortion and to provide materially greater space between its successive turns than the diameter of the wire of the other helix. To provide the desirable differential in stiffness between the ends and center of the reinforcement, the wire 15 is materially longer than the wire 16, and the end portions of the wire 15 extend approximately equal distances beyond the ends of the wire 16, as will be clear from Figs. 1 and 2. Each wire is of substantially uniform pitch throughout its extent, but the pitch of the shorter wire 16 is greater than that of the longer wire 15. The short wire 16 is made of such a length that its ends will respectively engage opposite axially presented sides of the other reinforcement-wire 15 at points spaced from the insulator, as indicated at A and B in Fig. 2.

By reason of the engagement of the short wire 16 with the long wire 15 at the points A and B, the two reinforcement wires are located in definite axial position relative to each other. Since the two wires are in contact with each other at the points A and B, and since each wire is of uniform pitch, a cross-section through the reinforcement at the mid-point of the short wire 16 will show the two reinforcement wires disposed on diametrically opposite sides of the line wire 10, as shown in Fig. 3, with the result that near the middle of the reinforcement the short wire 16 will approximately bisect the space between successive turns of the long wire 15 and be spaced from both of those turns with substantially equal spacing. The pitch of the reinforcement-wires should be so selected with reference to the base diameter of the insulator-groove that adjacent turns of the reinforcement will engage the walls of the insulator-groove and prevent contact of the line wire 10 therewith, as is shown in Fig. 2.

The arrangement illustrated in Figs. 1 to 3 and just described prevents any undesired contact between the line wire and the insulator. Further, at the points where the tie wire 13 is applied to the reinforcement, the two reinforcement-wires 15 and 16 will still be spaced apart and approximately diametrically opposite each other with respect to the line wire, and thus will prevent any contact between the latter and the tie wire. With the wire 16 shorter than the wire 15, the reinforcement provides a two-wire support for the line wire over the axial extent of the short wire 16 and a single-wire support for the line wire beyond the ends of the short wire 16. As a result, the reinforcement is stiffer over that portion occupied by the short wire 16 than it is beyond the ends of that wire. This arrangement is desirable in that it promotes an even distribution of stresses in the line wire.

The reinforcement illustrated in Fig. 4 comprises a long wire 20 and a short wire 21, each of uniform pitch throughout. This arrangement differs from that of Figs. 1 to 3, however, in that the shorter wire 21 has the shorter pitch. The length of the short wire 21, measured axially along the line wire, is such that its ends respectively engage opposite axially presented sides of the long wire 20 as indicated at C and D, thus locating the two reinforcement wires in definite axial position relative to each other and insuring that near the middle of the reinforcement the turns of the two reinforcement wires will be approximately equally spaced.

In the reinforcement of Fig. 5, long and short wires, 25 and 26 respectively, are employed. In this reinforcement, the central portion of the short wire 26 and the long wire 25 for its entire extent are of the same pitch. The end portions 27 of the short wire 26, however, are bent axially to engage respectively opposite axially presented sides of the long wire 26 at the points E and F. This engagement serves, as in previous instances, to locate the two reinforcement wires in definite axial position relative to each other. The outwardly bent end portions 27 of the wire 26 should be so formed that the intermediate turns of the short wire will be spaced midway between adjacent turns of the long wire 25.

In forming the reinforcement on the line wire, the several pre-formed helixes constituting it are separately applied. In so applying each helix, one of its ends is conveniently brought into and held in contact with the line wire, and the body of the helix is then wrapped progressively around the line wire. This can ordinarily be done by bare hands and without tools. Where the pre-formed helixes have an internal diameter such that they tightly grip the line wire when applied thereto, it is a practical impossibility for the lineman to move any helix relative to the other or others after their application has been completed. Accordingly, it is essential, and also in some instances sufficient, that each helix be properly located axially of the line wire when its application is begun. Where friction between each helix and the line wire can be relied on to prevent any axial displacement of the helixes when they are once applied, and thus where the only essential is that the wrapping of the second and each subsequently applied helix be started at the right place, it is still advisable to provide for interengagement of the helixes at one point, at least. Thus if the short helix 26 of Fig. 5 was provided with but one distorted end portion 27, the lineman, in beginning the application of the short helix, could properly locate it by holding its distorted end in engagement with the long helix 25, as at the point E. If this is done, the turns of the short helix, as they are successively applied to the line wire, will fall respectively midway between adjacent turns of the long helix in the desired manner; and friction between each helix and the line wire will retain the helixes in the relative disposition thus effected.

The reinforcement shown in Fig. 6 comprises two similar helically coiled wires 30 overlapping and intertwined for part of the length of each wire helix. Each of these wires has an extended center portion of uniform pitch, but an end turn 31 of at least one wire departs from this pitch to an extent such that when its extreme end is in contact with the other wire, as at point G, the inner turns of both wires will be approximately equally spaced. The reinforcement of Fig. 6 provides the same two-wire support over the center portion of the reinforcement and single-wire support at the ends of the reinforcement as do the reinforcements shown in Figs. 1 to 5, but differs from the structures of Figs. 1 to 5 in that both wires are identical. To make it unnecessary to distinguish between the wires 30 and between the ends of either in applying the reinforcement to the line wire 10, an irregular turn 31 may be provided at each end of each wire.

If both wires 30 of the reinforcement shown in Fig. 6 are identical, they will interengage, not only at the point G, but also at the symmetrically located point H. It is to be noted, however, that although one wire engages the other at two axially spaced points its engagement at both points is with the same axially presented side of such other wire and that the interengagement by itself prevents relative movement of the two wires in but one axial direction. Nevertheless, the irregular end turn 31 can be employed, as indicated above, to locate the two wires in the desired relative axial position when the application of the second wire is begun; and friction may thereafter be relied upon to maintain the two wires in that desired position.

The reinforcement of Fig. 7 is similar to that of Fig. 6 in that it embodies identical wires 35 which overlap axially of the line wire for only a portion of their total lengths. In this instance, the departure of each wire from uniform pitch is not confined to the extreme end turns thereof, but instead is represented by a gradual reduction in pitch throughout the extent of the overlapping portions. In other words, beginning at a point spaced well inwardly from each end of each of the wires 35, the pitch gradually decreases toward the end of the wire. When the second of the two wires 35 is to be applied to the line wire, its extreme end may be held against the side of the wire first applied, as at point J, and wrapping of the second wire about the line wire is proceeded with. If the two helixes are the same, and if the wrapping of the second has been begun with the proper amount of overlap, there will also be interengagement of the helixes at point K; but, as in Fig. 6, this two-point interengagement will locate the two helixes against movement in only one direction, and friction must be relied on to maintain the desired approximately equal turn-spacing at the center of the overlapping portions.

As in the cases of the reinforcements previously described, that of Fig. 7 provides a two-wire support for the line wire near the center of the reinforcement and a single-wire support near the ends of the reinforcement. The stiffness of a helix varies in the same sense as its pitch; and, as a result, each wire 35, being of gradually decreasing pitch toward its ends, is of gradually decreasing stiffness toward its ends. This tends to promote an even distribution of stresses in the line wire.

In Figs. 8 and 9, we have illustrated a reinforcement consisting of three wires instead of two. As shown, the three wires are of graduated lengths, the length of the wire 41 being intermediate that of the wires 40 and 42. In the particular form shown, axial positioning of the wires is attained by deformation of their extreme end portions, all three wires being otherwise of the same pitch. Specifically, one end, and preferably both ends, of each of the wires 41 and 42 is distorted, as indicated at 43, to provide for interengaging wires a turn-spacing approximately equal to one-third their common pitch. By employing the distorted end 43 to locate each of the wires 41 and 42 when its application is begun, the three reinforcement-wires may readily be so disposed that throughout the intermediate portion of the short wire 42 it and the wire 41 will trisect the space between successive turns of the wire 40, and the space is sufficiently great that the wires 40, 41, and 42 will not there interengage one another. A reinforcement comprising more than two wires of graduated length possesses a multi-step graduation in stiffness on each side of the insulator 12, and is especially suitable where the line-wire is of large diameter relative to the reinforcement wires.

Other forms of multi-wire reinforcements are possible in which one or more wires are so formed as to engage another or others and so locate the several wires axially that adjacent turns of the different wires will be approximately equally spaced at and near the middle of the reinforcement; and our invention is accordingly not limited to the specific forms of reinforcements shown. Whatever form the reinforcement may take, the wires of which it is comprised are desirably relatively hard and are pre-formed with regard to the particular diameter of the line-wire upon which they are to be used. The internal diameter of each reinforcement-wire helix should be no greater than the diameter of the line wire upon which it is to be used, and is preferably somewhat less than the line-wire diameter, so that when applied it will grip the line wire with sufficient force to prevent any relative movement.

The wires of which the reinforcement-helixes are formed need not be of the circular cross-section illustrated; nor is it essential that all helixes be formed of the same size wire. The term "line wire" as used herein embraces multi-strand as well as single-strand conductors.

We claim as our invention:

1. In combination with a line wire supported at spaced points along its length, means for reinforcing said line wire at and adjacent each said point of support, said means comprising a plurality of pre-formed, open-wound wire helixes of the same hand each embracing said line wire, said helixes being axially overlapping and intertwined with the different helixes spaced apart throughout most of their overlap but interengaging one another at at least one point to locate the helixes in definite axial position relative to each other with the adjacent turns of the different helixes approximately equally spaced around the line wire near the middle of the overlap.

2. In combination with a line wire supported at spaced points along its length, means for reinforcing said line wire at and adjacent each said point of support, said means comprising two pre-formed, open-wound wire helixes of the same hand each embracing said line wire, said helixes being arranged in axially overlapping relation on the line wire, adjacent turns of said two helixes being approximately equally spaced near the middle of their overlap, and one of said helixes engaging opposite axially presented sides of the other at points located near the respective ends of their overlap to locate the two helixes in definite axial position relative to each other.

3. A reinforcing means for a line wire, comprising a plurality of open-wound wire helixes of the same hand each adapted to embrace said line wire, said helixes being of such relative pitch that when in place on the line wire they overlap axially and intertwine in a relative axial position such that the adjacent turns of the different helixes are approximately equally spaced near the middle of the overlap and having interengaging portions which locate them in that relative axial position.

4. A reinforcing means for a line wire, comprising two open-wound helixes of the same hand each adapted to embrace the line wire, said helixes being capable of arrangement on the line wire in axially overlapping relationship, the respective pitches of said two helixes being near enough the same that their axially overlapping portions each comprises several turns, said helixes being so formed that points on one near the respective ends of their overlap will respectively engage opposite axially presented sides of the other and locate the two helixes in definite axial position relative to each other with their adjacent turns approximately equally spaced near the middle of their overlap.

5. In combination with a line wire supported at spaced points along its length, means for reinforcing said line wire at and adjacent each said point of support, said means comprising two pre-formed, open-wound helixes each embracing said line wire and of different lengths, the shorter of said helixes comprising several turns and being located within the axial limits of the longer, the turns of the two helixes near the middle of the shorter one being approximately equally spaced and the ends of the shorter helix respectively engaging opposite axially presented sides of the larger helix to locate the two helixes in fixed axial position relative to each other.

6. The invention set forth in claim 5 with the addition that the shorter helix is located approximately centrally of the longer helix whereby the end portions of the latter will extend approximately equal distances along said line wire beyond the ends of the former.

7. A reinforcing means for a line wire, comprising two open-wound helixes of the same hand each adapted to embrace the line wire, one of said helixes being shorter than the other and capable of being arranged coaxially with and within the axial limits of the other, the shorter helix having ends adapted when the helixes are so arranged to engage respectively opposite axially presented sides of the longer helix to locate the two helixes in definite axial position relative to each other with their adjacent turns approximately equally spaced near the middle of the shorter helix.

8. The invention set forth in claim 5 with the addition that each of said helixes is of uniform pitch throughout its extent, the respective pitches of the two helixes being different from each other.

9. The invention set forth in claim 7 with the addition that each of said helixes is of uniform pitch throughout its extent, the respective pitches of the two helixes being different from each other.

10. In combination with a line wire supported at spaced points along its length, means for reinforcing said line wire at and adjacent each said point of support, said means comprising a plurality of pre-formed, open-wound wire helixes of the same hand each embracing said line wire, said helixes being arranged in axially overlapping relation on the line wire with their turns in the vicinity of said support approximately equally spaced, one of said helixes engaging an axially presented side of another at a point spaced from said support.

11. In combination with a line wire supported at spaced points along its length, means for reinforcing said line wire at and adjacent each said point of support, said means comprising two pre-formed, open-wound wire helixes of the same hand each embracing said line wire, said helixes being arranged in axially overlapping relation on the line wire, adjacent turns of said two helixes being approximately equally spaced near the middle of the overlap, and one of said helixes engaging opposite axially presented sides of the other to locate the two helixes in definite axial position relative to each other.

12. A reinforcing means for a line wire, comprising two open-wound helixes of the same hand each adapted to embrace the line wire, said helixes being capable of arrangement on the line wire in axially overlapping relationship, the respective pitches of said two helixes being near enough the same that their axially overlapping portions each comprises several turns, said helixes being so formed that points on one will respectively engage opposite axially presented sides of the other and locate the two helixes in definite axial position relative to each other with their adjacent turns approximately equally spaced near the middle of the overlap.

13. The invention set forth in claim 2 with the addition that each of said helixes overlaps the other for only a portion of its length.

14. In combination with a line wire supported at spaced points along its length, means for reinforcing said line wire at and adjacent each said point of support, said means comprising two preformed, open-wound wire helixes of the same hand each embracing said line wire, said helixes being arranged in axially overlapping relation on the line wire, adjacent turns of said two helixes being approximately equally spaced near the middle of the overlap, and one of said helixes engaging an axially presented face of the other at a point near one end of the overlap.

HARRY L. KITSELMAN.
ALVIN W. HOLMES.